US006896119B2

(12) United States Patent
Wiesinger et al.

(10) Patent No.: US 6,896,119 B2
(45) Date of Patent: May 24, 2005

(54) METHOD OF STOPPING CONVEYING EQUIPMENT FOR PERSONS

(75) Inventors: Josef Wiesinger, Vienna (AT); Gerhard Stoiber, Gösting (AT)

(73) Assignee: Inventio AG, Hergiswil (CH)

( * ) Notice: Subject to any disclaimer, the term of this patent is extended or adjusted under 35 U.S.C. 154(b) by 150 days.

(21) Appl. No.: 10/328,314

(22) Filed: Dec. 23, 2002

(65) Prior Publication Data

US 2003/0150691 A1 Aug. 14, 2003

(30) Foreign Application Priority Data

Dec. 24, 2001 (EP) ........................................... 01811268

(51) Int. Cl.[7] ............................................... B65G 17/00
(52) U.S. Cl. ....................................... 198/323; 198/322
(58) Field of Search ................................ 198/321, 322, 198/323, 330

(56) References Cited

U.S. PATENT DOCUMENTS

| | | | | |
|---|---|---|---|---|
| 4,139,810 A | * | 2/1979 | Ueki et al. | 198/323 |
| 4,588,065 A | * | 5/1986 | Maiden et al. | 198/323 |
| 5,337,878 A | * | 8/1994 | Mehlert et al. | 198/323 |
| 6,267,219 B1 | * | 7/2001 | Spannhake et al. | 198/323 |
| 6,273,234 B1 | | 8/2001 | Balzer-Apke et al. | |

FOREIGN PATENT DOCUMENTS

| | | |
|---|---|---|
| FR | 2 464 912 | 3/1981 |
| GB | 2156173 A | 10/1985 |

* cited by examiner

*Primary Examiner*—James R. Bidwell
(74) *Attorney, Agent, or Firm*—Schweitzer Cornman Gross & Bondell LLP

(57) ABSTRACT

The invention relates to a method for stopping conveying equipment for persons of the type that includes a drive motor, a frequency converter for controlling motor operation, and a holding brake. On activation of a safety element a the frequency converter decreases the speed of the drive motor according to a pre-established braking ramp, the holding brake being activated before standstill of the conveying equipment. Operational safety of the braking system is thus increased.

5 Claims, 1 Drawing Sheet

METHOD OF STOPPING CONVEYING EQUIPMENT FOR PERSONS

The present invention relates to a method for stopping conveying equipment for persons utilizing a holding brake.

BACKGROUND OF THE INVENTION

The use of the term "conveying equipment for persons" herein is to be understood to encompass not only escalators, but also moving walkways.

A method for braking rolling stairs or rolling walkways has become known from specification DE-198 03 899 C2 in which, on response of a safety element, a braking ramp is activated by way of which the speed of the step belt or plate belt is brought to a zero value. The holding brake is activated at the instant of standstill of the rolling stairs or the rolling walkway.

In such a methodology the holding brake does not have an ideal braking function. No friction braking takes place, which can lead to unpredictable operational safety of the holding brake.

The present invention has an object of providing a method for the stopping of conveying equipment for persons which does not have the aforesaid disadvantages and which increases the operational safety of the holding brake.

BRIEF DESCRIPTION OF THE INVENTION

In accordance with the invention, a braking of a conveying equipment for persons in the event of operation of a safety system is performed by the controlled braking of the equipment in accordance with a pre-established braking ramp implemented by varying the output of a frequency converter driving the equipment's drive motor. Before the conveying equipment for persons is brought to a standstill a holding brake is activated. The frequency converter can be turned off after the holding brake is activated.

Activation of the holding brake shortly before standstill of the conveying equipment for persons means that the holding brake is activated when the conveying equipment for persons is, in the case of retardation, still in motion, i.e. when the drive motor is not yet completely stopped. The holding brake is preferably activated at a speed of approximately 20% of the normal speed of the conveying equipment for persons so that frictional braking takes place. This controlled activation of the holding brake increases the operational safety of the operating system.

Advantageously, the frequency converter is switched off only when the holding brake is applied. This has the advantage that there is no jerking of the motor, which can be an unpleasant acceleration and a disturbing noise for the passengers. The stopping of the conveying equipment for persons is thus optimised and increases travel comfort.

Advantageously, the speed of conveying equipment for persons is constantly monitored and the holding brake is activated when the conveying equipment for persons has reached a speed of 0.1 m/s in the braking ramp. This ensures that the holding brake engages at the correct speed.

The invention further has the advantage that, due to the jerk-free stopping of the motor, the drive system does not produce any unnecessary noise and is free of wear, whereby the service life of the components is increased.

The explained features are usable not only in the respectively indicated combination, but also in other combinations or by themselves without departing from the scope of the invention.

BRIEF DESCRIPTION OF THE DRAWINGS

The invention is explained in greater detail through the examples of embodiment set forth in the following description, accompanied by the annexed drawings, in which.

DETAILED DESCRIPTION OF THE INVENTION

Figure 1:
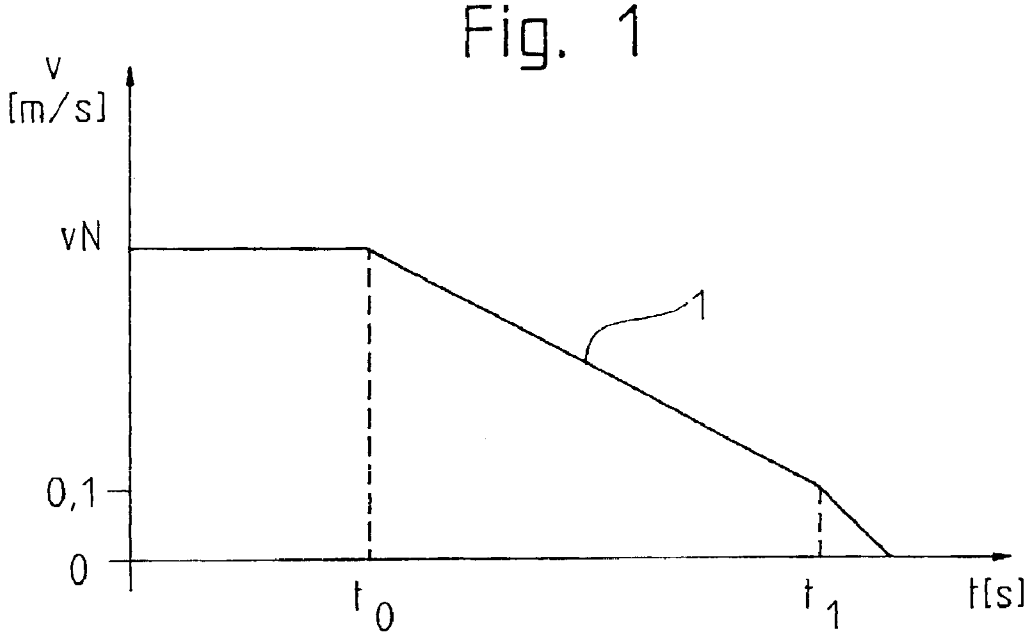
FIG. 1 is a graphical illustration of the speed behaviour during stopping of conveying equipment for persons with the methodology of the invention.

FIG. 1 is a graphical illustration of a load-independent braking of the step belt or plate belt of an escalator or a moving walkway. There are two kinds of braking, namely electrical braking and holding brake braking. Electrical braking is used for operational braking wherein a drive motor 4 is braked by way of a frequency converter 2 over a set braking ramp 1. If the electrical braking is interrupted, then there is further braking by the holding brake 3. The holding brake 3 is an electromechanical brake, which preferably acts on the motor shaft in the drive motor 4 in mechanically positive manner. In the case of sole action of the holding brake 3, brake travel as defined in the applicable standards/guidelines is maintained.

Braking activation can take place by reason of an emergency stop or a fault response by a safety element. In FIG. 1 the speed v is indicated as a function of time t, wherein the normal speed of the conveying equipment for persons is denoted by vN. The speed profile of braking ramp 1, which is developed through the frequency converter 2, defines a predetermined braking travel over a predetermined time t. The speed v of the conveying equipment for persons is thus brought to the value 0 m/s with a defined retardation. At the instant $t_0$, the braking ramp 1 of the frequency converter 2 is activated to brake the conveying equipment with substantially uniform deceleration. At the instant $t_1$ shortly before the stopping of the conveying equipment for persons, the holding brake 3 engages. This preferably happens at a minimum speed of 0.1 m/s, which corresponds to approximately 20% of the normal speed vN. The frequency converter 2 is switched off only when the holding brake has already initiated its action. The frequency converter is thus switched off when the motor 4 is already stopped. This leads to significant advantages for operation of the motor, as switching-off of the frequency converter 2, in fact, usually does not take place linearly. Jerks occur, which can lead to undesired noise or damage to the gears or disturbance at the mains.

Figure 2:
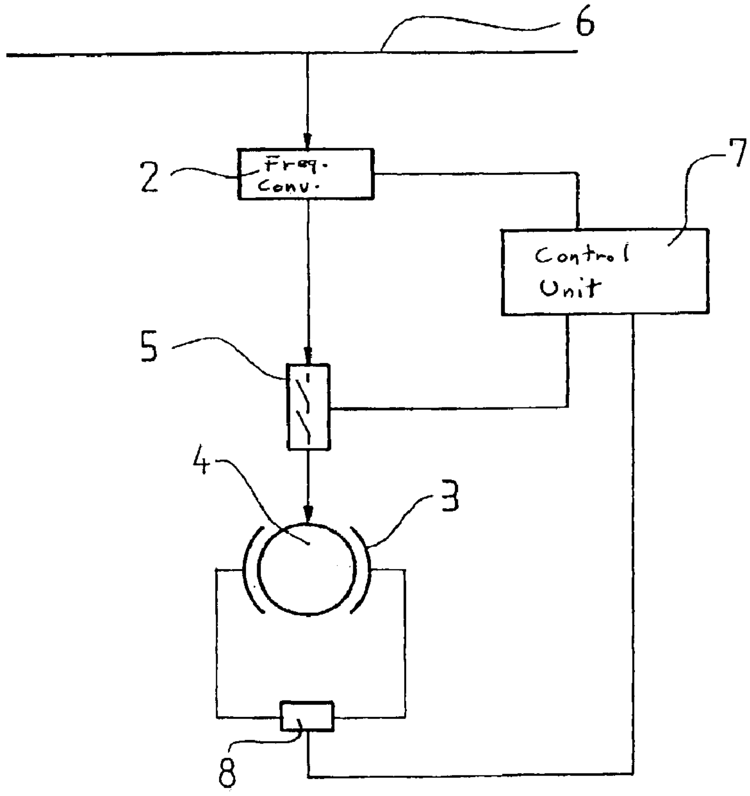
FIG. 2 is a block diagram of the braking system according to the invention.

FIG. 2 shows a basic illustration of a braking system according to one embodiment of the invention. The frequency converter 2 is connected with the motor 4 by way of switching elements 5. The energy supply 6 supplies the frequency converter 2, which is disposed in operative connection with a control unit 7. The control unit 7 is also disposed in operative connection with the switching elements 5 as well as with a brake magnet 8. The monitoring of safety elements, such as, for example, a safety circuit, is performed by control unit 7. The triggering of a safety element is detected by control unit 7, which signals to the frequency converter 2 to initiate an electrical braking, i.e. a controlled, gentle braking process. Although the safety circuit is interrupted by the triggering of a safety element, the contacts of the switching elements 5 are kept closed, so that the frequency converter 2 can always act on the motor 4 during electrical braking.

The speed of the conveying equipment for persons is constantly measured. This can take place, for example, by a rotational speed pick-up for the motor 4. The holding brake 3 engages shortly before standstill of the conveying equipment for persons, preferably at a speed of 0.1 m/s.

We claim:

1. A method for stopping conveying equipment for persons having a holding brake, a drive motor, a frequency converter controlling the operation of the drive motor and braking, and a holding brake, wherein on activation of a safety element the frequency converter decreases the speed of the drive motor according to a pre-established braking ramp, the holding brake being activated before standstill of the conveying equipment for persons.

2. The method according to claim 1, characterized in that the frequency converter is switched off at or subsequent to the time when the holding brake is activated.

3. The method according to claim 1 or 2, characterized in that the speed of the conveying equipment for persons is constantly measured while the speed of the drive motor is being decreased.

4. The method according to claim 1 or 2, characterized in that the holding brake is activated when the conveying equipment for persons has decreased to a speed of 0.1 m/s.

5. The method according to claim 3 characterized in that the holding brake is activated when the conveying equipment for persons has decreased to a speed of 0.1 m/s.

* * * * *